Jan. 23, 1968  SUSUMU HANYU  3,365,597
ELECTRIC MOTOR
Filed June 29, 1965
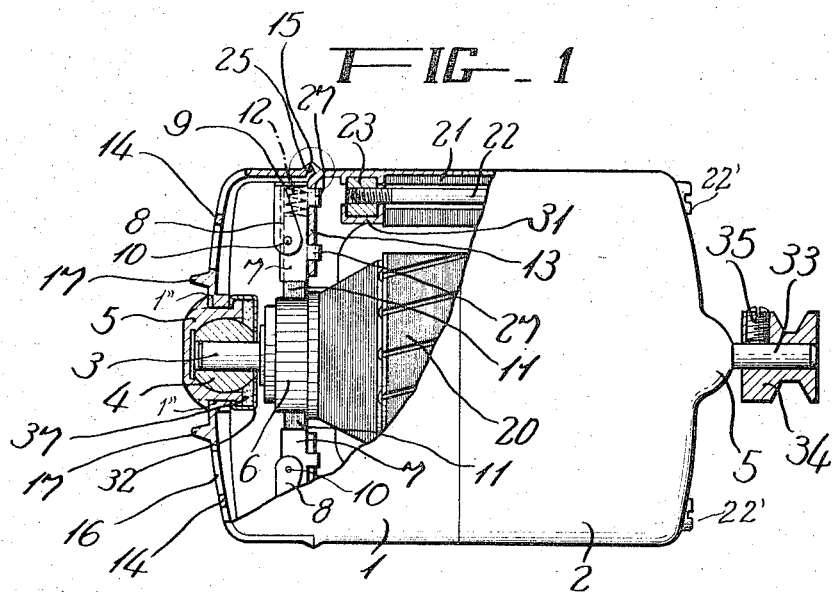
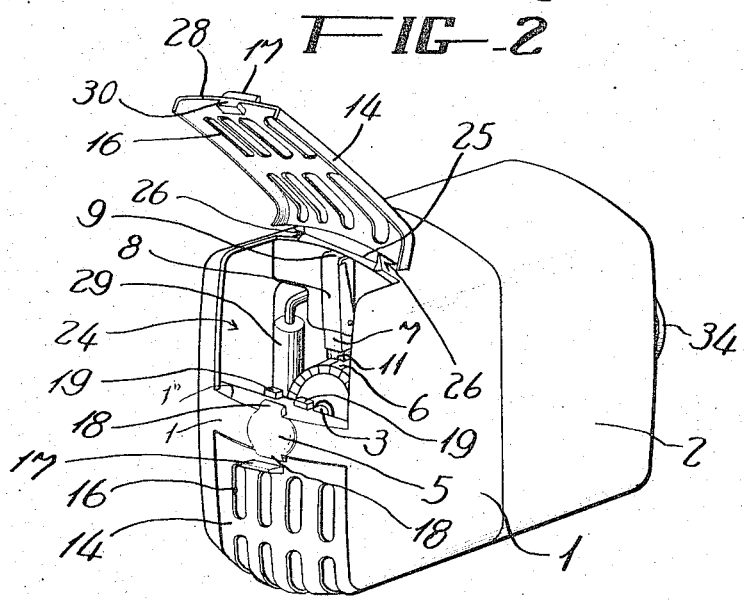
INVENTOR.
Susumu Hanyu
BY
Michael J. Striker

United States Patent Office 3,365,597
Patented Jan. 23, 1968

3,365,597
ELECTRIC MOTOR
Susumu Hanyu, Tokyo, Japan, assignor to Janome
Sewing Machine Co., Ltd., Tokyo, Japan
Filed June 29, 1965, Ser. No. 467,979
Claims priority, application Japan, July 6, 1964,
39/37,322
14 Claims. (Cl. 310—89)

The present invention relates to an electric motor and more specifically to a fractional horsepower electric motor having improved housing and cover means.

Fractional horsepower motors, as for instance used for driving of sewing machines, are usually enclosed in a housing which is substantially closed so as to prevent entrance of dust and dirt into the housing. The housing of motors of this type are usually provided with windows through which the contact condition of the brushes of the motor with the commutator can be observed and the housing of such motors usually include separate cover means which can be detached from the remainder of the housing when exchange of the brushes becomes necessary. This leads to a relatively complicated construction in which exchange of the brushes requires at least partial disassembly of the housing of the motor, which makes such an operation time consuming and complicated.

It is an object of the present invention to provide housing means for an electric motor, and especially for a fractional horsepower electric motor which are constructed in such a manner that the brushes can be easily exchanged, when such an exchange becomes necessary and in which partial disassembly of the housing means during exchange of the brushes is not necessary.

It is an additional object of the present invention to provide housing means in an electric motor of the aforementioned type in which all parts of the motor are arranged and which provides for a perfect insulation of the parts of the motor arranged therein.

It is a further object of the present invention to provide for housing means for an electric motor which are constructed of relatively few and simple parts so that the housing means can be manufactured at reasonable cost and so that the housing means can be assembled and disassembled in a very expedient manner.

It is also an object of the present invention to provide housing means on which the brushes of the motor are held in a convenient manner and located in such a way that they can be easily inspected and replaced when necessary.

With these objects in view, the present invention comprises in an electric motor including a stator, a rotor and a pair of brushes arranged spaced from each other at one end of the rotor, housing means made from plastic material enclosing and supporting the stator, the rotor and the brushes and being formed with a pair of openings in the region of the brushes to provide access to the latter, a pair of covers of plastic material extending across the openings, respectively, and a pair of hinge means connecting the covers to the housing means movable between an open and a closed position, each of the hinge means being constituted by an elongated thin and flexible portion of plastic material integral with the housing means and the respective cover.

Preferably, the housing means is formed from two substantially cup-shaped housing members having each a peripheral wall and an end wall and these housing members abut against each other along free edges of the peripheral walls and one of the housing members is formed at its end wall thereof with the aforementioned openings respectively located in the region of the brushes to provide access to the latter. The electric motor includes further connecting means operatively connected to the housing members for releasably connecting the same and for maintaining the free edges thereof in abutment with each other. The connecting means may comprise a pair of bolts extending through bores in the end wall of one of the housing members and each of the bolts has a transverse end portion engaging the outer surface of the end wall in the one housing member while being releasably connected at the other end thereof to the other housing member.

The cup-shaped housing member which is formed at its end wall with the aforementioned pair of openings has also preferably a pair of plate portions located respectively inwardly of the openings and extending toward the axis of the cup-shaped housing member. The pair of brush means are respectively mounted on the aforementioned plate portions so that upon moving the covers to the open position, the brush means may be inspected. Each of the brush means preferably includes a brush member engaging with one end thereof the commutator of the motor, spring means engaging the other end of the brush member and biased to press the one end of the latter against the commutator, and a brush holder carried by the respective plate and housing the brush member and the spring means. The spring means is preferably a coil compression spring and the brush member may include a tubular member guiding the brush member for movement toward the commutator and formed with a cutout facing the respective opening in the end wall of the housing member, and a member hinged at a portion thereof adjacent the commutator to the tubular member and having a front portion extending in front of the cutout and an end portion extending transverse to the front portion over the end of the tubular member distance from the commutator and holding the spring means in the tubular member.

In the aforementioned arrangement the condition of the brushes can be easily inspected by moving the covers to the open position thereof and exchange of the brushes can be carried out in an expedient manner by turning the hinged member of the brush holder so that the respective brush can be removed from the tubular member through the cutout formed in the same. None of the parts of the electric motor has to be disassembled from the remainder thereof during exchange of the brushes and no screw connection has to be loosened, which will assure that exchange of the brushes can be carried out in a quick and simple manner and which further will assure that during such an exchange no parts of the electric motor unscrewed therefrom will become lost.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned side view of the motor of the present invention; and FIG. 2 is a perspective view of the electric motor shown in FIG. 1 with one of the covers shown in open and the other in closed position.

Referring now to the drawing, it will be seen that the motor according to the present invention mainly comprises a pair of substantially cup-shaped housing members 1 and 2 formed from plastic material such as for instance polypropylene or any other synthetic resin material. Each housing member has a peripheral wall and an end wall at one end of the peripheral wall. The members 1 and 2 abut with free edges of the peripheral walls against each other. A pair of spherical bearing members 4 each formed with a bore therethrough are mounted in correspondingly shaped portion 5 formed in the end walls of the housing members 1 and 2 so that the bores through the metallic bearing members 4 are aligned along a common axis. The shaft 3 of a rotor 20 of known construction is mounted in the bores of the bearing members 4 for rotation about the axis of the bores. An end portion 33 of the shaft 3, shown in FIG. 1 as the right end portion of the shaft, projects beyond the portion 5 of the housing member 2, and this end portion carries a pulley 34 fixed to the end portion 33 of the shaft by a set screw 35. A commutator 6 is carried on the shaft between the rotor 20 and the other end portion thereof. Stator means 21 formed by laminations of magnetizable material at least partly surround the rotor 20 spaced therefrom by an air gap which, for clarity's sake, is shown enlarged in FIG. 1. It is understood that the stator means 21 include also a stator winding of known construction which is not shown in the drawing. The laminations forming the stator means 21 are formed with a pair of bores therethrough respectively aligned along common axes parallel to the axis of the shaft 3 and a pair of bolts 22 respectively extend through the aligned bores of the stator means 21. The bolts 22 extend also through appropriate bores in the housing member 2 and the heads 22' located at one end of the bolts 22 engage the outer surface of the housing member 2 about the bores therethrough. The other end of each bolt 22 is formed with a screw thread threadingly engaged in a nut 23 which in turn is held against rotation in appropriately formed portions 13 integral with the housing member 1 so that the housing members 1 and 2 are held by the bolts 22 in abutting relationship.

By unscrewing the threaded ends of the bolts 22 from the nuts 23, the two housing members 1 and 2 may be taken apart and the stator 21 as well as the rotor 20 may be easily removed from the housing. The peripheral walls of the housing members 1 and 2 have preferably a substantially elliptical cross section and the housing member 1 is formed with a pair of plate portions 13 arranged substantially along the larger axis of the elliptical cross section of the peripheral wall thereof and extending from the peripheral wall towards the axis of the shaft 3. A pair of brush holder means, each including a tubular member 7, are mounted by means of prongs 27 on the plate portions 13, respectively. A pair of brushes 11 are respectively located in the tubular members 7 and the brushes 11 engage with one end thereof the commutator whereas the other end of each brush is engaged by a coiled compression spring 12 which is biased to keep the one end of each brush 11 in contact with the commutator 6. Each of the tubular members 7 is formed at a portion thereof facing the end wall of the housing member 1 with a cutout and a member 8 hinged at 10 to each of the tubular members 7 extends with a front portion thereof transversely over the cutout formed in each tubular member 7, whereas an end portion 9 integral with the member 8 and extending transversely to the front portion thereof extends over the end of each tubular member 7 and engages the outer end of the respective compression spring 12 to hold the latter in the tubular member 7 and in engagement with the brush member 11 located therein.

The end wall of the housing member 1 is formed with a pair of relatively large openings 24 which are arranged spaced from each other and respectively opposite the brush holders 7. The openings 24 leave on the end wall of the housing member 1 a web portion 1' having opposite edge faces 1" which are parallel to each other and substantially normal to the axis along which the tubular brush holders 7 are arranged. A pair of covers 14 of the same plastic material as the housing member 1 extend respectively across the openings 24, and a pair of hinge means 15 respectively connect the covers 14 to the housing member 1 movable between an open and a closed position. The hinge means 15 are integrally formed with and from the same plastic material as the covers 14 and the housing member 1. An elongated recess 25 is formed in the region where each cover 14 joins the peripheral wall of the housing member 1 so that only an elongated substantially straight and thin flexible portion of plastic material integral with the housing member 1 and the respective cover 14 remains which forms the hinge means 15 hinging the respective cover to the peripheral wall of the housing member 1. The hinge means 15 do not extend all the way to the side edges of the respective cover 14, but, as can be clearly seen from FIG. 2, cutouts 26 are formed at opposite ends of hinge means 15 so that the length of the hinge means 15 is shorter than the width of the respective cover 14. The thin, elongated and substantially straight flexible portion 15 forming the hinge means will withstand frequent bending without breaking so that the covers 14 are securely connected to the housing member 1 easily movable between an open and a closed position.

Cooperating means are provided on the front wall of the housing cover 1 and on the covers 14, respectively for releasably holding the covers 14 in the closed position. These cooperating means may include a pair of flexible short projections 18 respectively projecting from the outer central portions of the end faces 1" of the web portion 1' of the housing member 1 and cooperating with a correspondingly shaped guide portion 30 formed on the edge 28 of each cover which is opposite the edge of the cover on which the hinge means 15 is provided. The arrangement includes preferably further a pair of projections 19 projecting from an inner portion of each of the edge faces 1" and adapted to engage the rear face of each cover adjacent the edge 28 thereof limiting thereby the inward movement of the respective edge 28 of each cover. Each cover 14 has preferably also a gripping portion 17 projecting from the outer surface thereof adjacent the edge 28 thereof which can be easily gripped so as to turn the respective cover 14 between the open and the closed position thereof. Each of the covers 14 is preferably formed with a plurality of ventilating openings 16.

Each of the bearings preferably includes also an oil impregnated felt washer 37 engaging the spherical bearing member 4 as shown in FIG. 1, and the felt washer 37 is held by means of a cup-shaped metal member 32 in engagement with the spherical member 4 in the manner as clearly illustrated in FIG. 1. FIG. 2 also schematically illustrates a condenser 29 operatively connected in a known manner into the circuit supplying electric current to the brushes, whereas the conductors which supply electric current to the brushes and to the winding of the stator means are not illustrated in the drawing. It is however to be understood that such conductors extend in a known manner through appropriate openings which are preferably formed in the housing member 1.

The covers 14, the hinge means 15 connecting the covers to the housing member 1 and the latter may be integrally molded from plastic material. The covers 14 can be easily moved between the closed and the open position thereof and the covers will provide in the open position easy access to the brush holders. In the open position of the covers 14 the members 8 hinged to the tubular brush holder 7 may be easily turned about their hinge means 10 so that the brush members 11 may be easily removed from the tubular brush holder 7 if replacement of the brush member should become necessary. By arranging the brush holder 7 along the large axis of the elliptically shaped peripheral wall of the housing member 1 relatively long brush members 11 and relatively long coil spring 12 may be provided in the electric motor. The various parts of the electric motor can be easily assembled or disassembled by simply unscrewing the bolts 22 from the nuts 23. The nuts 23 may be placed as inserts in the mold in which the housing member 1 is molded so that the portions 13 of the housing member 1 which hold the nuts 23 may be molded about the nuts. Since the nuts 23 and the portions 13 holding the nuts are located inwardly of the plates 13 on which the brush holders are mounted, the means for connecting the two housing members 1 and 2 to each other will in no way limit the length of the brush holder means nor hinder easy inspection of the brushes or easy exchange thereof from the brush holders.

It will be understood that each of the elements described above, or two or more together, may also find a useful application in other types of electric motors differing from the types described above.

While the invention has been illustrated and described as embodied in an electric motor provided with a pair of covers hinged to the housing means and arranged to provide easy access to the brushes of the electric motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehened within the meaning and range of equivalence of the following claims.

What is claimed as new and desired to be secured by Letters Patent is:

1. In an electric motor including a stator, a rotor and a pair of brushes arranged spaced from each other at one end of said rotor, in combination, housing means made from plastic material enclosing and supporting said stator, said rotor and said brushes and being formed with a pair of openings in the region of said brushes to provide access to the latter; a pair of covers of plastic material extending across said openings, respectively; and a pair of hinge means connecting said covers to said housing means movable between an open and a closed position, each of said hinge means being constituted by an elongated, thin and flexible portion of plastic material integral with said housing means and the respective cover.

2. In an electric motor including a stator, a rotor and a pair of brushes arranged spaced from each other at one end of said rotor, in combination, housing means made from plastic material enclosing and supporting said stator, said rotor and said brushes, said housing means being formed by two substantially cup-shaped housing members having each a peripheral wall and an end wall, said housing members abutting against each other along free edges of said peripheral walls and one of said housing members being formed in its end wall with a pair of openings respectively located in the region of said brushes to provide access to the latter; a pair of covers of plastic material extending across said openings, respectively; a pair of hinge means connecting said covers to said one housing member movable between an open and a closed position, each of said hinge means being constituted by an elongated, thin and flexible portion of plastic material integral with said one housing member and the respective cover; and connecting means operatively connected to said housing members for releasably connecting the same and for maintaining the free edges thereof in abutment with each other.

3. In an electric motor including a stator, a rotor and a pair of brushes arranged spaced from each other at one end of said rotor, in combination, housing means made from plastic material enclosing and supporting said stator, said rotor and said brushes, said housing means being formed by a first and a second substantially cup-shaped housing member having each a peripheral wall and an end wall, said housing members abutting against each other along free edges of said peripheral walls and said first housing member being formed in its end wall with a pair of openings respectively located in the region of said brushes to provide access to the latter; a pair of covers of plastic material extending across said openings, respectively; a pair of hinge means connecting said covers to said first housing member movable between an open and a closed position, each of said hinge means being constituted by an elongated, thin and flexible portion of plastic material integral with said first housing member and the respective cover; and connecting means operatively connected to said housing members for releasably connecting the same and for maintaining the free edges thereof in abutment with each other, said connecting means comprising a pair of bolts extending through bores in the end wall in one of said housing members, each of said bolts having a transverse end portion engaging the outer surface of the end wall in said one housing member and being releasably connected at the other end thereof to the other housing member.

4. In an electric motor including a stator, a rotor and a pair of brushes arranged spaced from each other at one end of said rotor, in combination, housing means made from plastic material enclosing and supporting said stator, said rotor and said brushes, said housing means being formed by a first and a second substantially cup-shaped housing member having each a peripheral wall and an end wall, said housing members abutting against each other along free edges of said peripheral walls and said first housing member being formed in its end wall with a pair of openings respectively located in the region of said brushes to provide access to the latter; a pair of covers of plastic material extending across said openings, respectively; a pair of hinge means connecting said covers to said first housing member movable between an open and a closed position, each of said hinge means being constituted by an elongated, thin and flexible portion of plastic material integral with said first housing member and the respective cover; and connecting means operatively connected to said housing members for releasably connecting the same and for maintaining the free edges thereof in abutment with each other, said connecting means comprising a pair of bolts extending through bores in the end wall in one of said housing members, each of said bolts having a transverse end portion engaging the outer surface of the end wall in said second housing member and being releasably connected at the other end thereof to said first housing member.

5. In an electric motor including a stator, a rotor and a pair of brushes arranged spaced from each other at one end of said rotor, in combination, housing means made from plastic material enclosing and supporting said stator, said rotor and said brushes, said housing means being formed by two substantially cup-shaped housing members having each a peripheral wall and an end wall, said housing members abutting against each other along free edges of said peripheral walls and one of said housing members being formed in its end wall with a pair of openings respectively located in the region of said brushes to provide access to the latter; a pair of covers of plastic material extending across said openings, respectively; a pair of substantially parallel hinge means connecting said covers to said one housing member movable between an open and a closed position, each of said hinge means being constituted by an elongated, straight, thin and flexible portion of plastic material integral with said one housing member and the respective cover; and connecting means operatively connected to said housing members for releasably connecting the same and for maintaining the free edges thereof in abutment with each other.

6. In an electric motor including a stator, a rotor and a pair of brushes arranged spaced from each other at one end of said rotor, in combination, housing means made from plastic material enclosing and supporting said stator, said rotor and said brushes, said housing means being formed by two substantially cup-shaped housing members having each a peripheral wall and an end wall, said housing members abutting against each other along free edges of said peripheral walls and one of said housing members being formed in its end wall with a pair of openings respectively located in the region of said brushes to provide access to the latter; a pair of covers of plastic material extending across said openings, respectively; a pair of hinge means connecting said covers to said one housing member movable between an open and a closed position, each of said hinge means being constituted by an elongated, thin and flexible portion of plastic material integral with said one housing member and the respective cover; connecting means operatively connected to said housing members for releasably connecting the same and for maintaining the free edges thereof in abutment with each other; and cooperating means on said covers and on said end wall of said one housing member for releasably holding said covers in closed position.

7. In an electric motor including a stator, a rotor and a pair of brushes arranged spaced from each other at one end of said rotor, in combination, housing means made from plastic material enclosing and supporting said stator, said rotor and said brushes, said housing means being formed by two substantially cup-shaped housing members having each a peripheral wall and an end wall, said housing members abutting against each other along free edges of said peripheral walls and one of said housing members being formed in its end wall with a pair of openings respectively located in the region of said brushes to provide access to the latter and leaving between said openings a web having substantially parallel edge faces; a pair of covers of plastic material extending across said openings, respectively; a pair of hinge means connecting said covers to said one housing member movable between an open and a closed position, each of said hinge means being constituted by an elongated, thin and flexible portion of plastic material integral with said one housing member and the respective cover; connecting means operatively connected to said housing members for releasably connecting the same and for maintaining the free edges thereof in abutment with each other; and cooperating means on said covers and on said end wall of said one housing member for releasably holding said covers in closed position, said cooperating means comprising a pair of short projections on said end wall of said one housing member and respectively projecting from said edge faces of said web, and a guide portion on each cover adapted to snap over the respective projection during movement of the respective cover from said open to said closed position thereof.

8. In an electric motor including a stator, a rotor and a pair of brushes arranged spaced from each other at one end of said rotor, in combination, housing means made from plastic material enclosing and supporting said stator, said rotor and said brushes, said housing means being formed by two substantially cup-shaped housing members having each a peripheral wall and an end wall, said housing members abutting against each other along free edges of said peripheral walls and one of said housing members being formed in its end wall with a pair of openings respectively located in the region of said brushes to provide access to the latter and leaving between said openings a web having substantially parallel edge faces; a pair of covers of plastic material extending across said openings, respectively; a pair of hinge means connecting said covers to said one housing member movable between an open and a closed position, each of said hinge means being constituted by an elongated, thin and flexible portion of plastic material integral with said one housing member and the respective cover; connecting means operatively connected to said housing members for releasably connecting the same and for maintaining the free edges thereof in abutment with each other; and cooperating means on said covers and on said end wall of said one housing member for releasably holding said covers in closed position, said cooperating means comprising a pair of short projections on said end wall of said one housing member and respectively projecting from outer portions of said edge faces of said web, and a guide portion on each cover adapted to snap over the respective projection during movement of the respective cover from said open to said closed position thereof, and at least one additional projection projecting from an inner portion of each of said edge faces and adapted to engage an inner surface portion of the respective cover.

9. An electric motor comprising, in combination, a pair of cup-shaped housing members of plastic material having each a peripheral wall and an end wall at one end of said peripheral wall, said members abutting with free edges of said peripheral walls against each other; a pair of bearing means respectively carried by said end walls of said housing members aligned along a common axis, and one of said housing members being formed in the end wall thereof and on opposite sides of the bearing means carried thereby with a pair of openings and inwardly spaced from said openings with a pair of plate portions extending from the peripheral wall of said one housing member toward said common axis; rotor means rotatably mounted in said bearing means and including a commutator; a pair of brush means respectively carried by said plate portions of said one housing member and engaging said commutator; stator means at least partially surrounding said rotor means and engaging with an outer surface thereof the inner surface of said peripheral walls of said housing members; bolt means respectively extending through the other housing member and through said stator means and being releasably connected to said one housing member for holding said housing members in abutment with each other; a pair of covers of plastic material extending across said openings in said end wall of said one housing member; and a pair of hinge means connecting said covers to said one housing member movable between an open and a closed position, each of said hinge means being constituted by an elongated, thin and flexible portion of plastic material integral with said one housing member and the respective cover.

10. An electric motor as set forth in claim 9, wherein said stator means is formed from a plurality of laminations formed with aligned bores therethrough through which said bolt means respectively extend and wherein each of said bolt means includes a head at one end thereof engaging the outer surface of the end wall of the other housing member, and a nut screwed onto the other end of each bolt means, and including means on said one housing member inwardly of said plate portions for holding said nut in a fixed position.

11. An electric motor as set forth in claim 9, wherein each of said brush means includes a brush member engaging with one end thereof said commutator, spring means engaging the other end of said brush member and biased to press said one end of the latter against said commutator, and a brush holder carried by the respective plate portion and housing said brush member and said spring means.

12. An electric motor as set forth in claim 11, wherein said spring means is a coiled compression spring, and wherein said brush holder includes a tubular member guiding said brush member for movement toward said commutator and being formed with a cutout facing the respective opening in the end wall of said one housing member, and a member hinged at a portion thereof adjacent said commutator to said tubular member and having a front portion extending in front of said cutout and an end portion extending transverse to said front portion over the end of said tubular member distant from said commutator and holding said spring means in said tubular member.

13. An electric motor as set forth in claim 9, wherein said peripheral walls of said housing members have each a substantially elliptical cross section and wherein said brush means are aligned along the large axis of said elliptical cross section.

14. An electric motor as set forth in claim 9, and including a gripping portion on each cover projecting outwardly therefrom.

References Cited

UNITED STATES PATENTS 2,298,155   10/1942   Perkins _____ 310—43

MILTON O. HIRSHFIELD, *Primary Examiner.*

L. L. SMITH, *Assistant Examiner.*